(12) United States Patent
Rydsmo

(10) Patent No.: US 9,302,648 B2
(45) Date of Patent: Apr. 5, 2016

(54) SEAT BELT PRETENSIONER

(75) Inventor: Erik Rydsmo, Sollebrunn (SE)

(73) Assignee: AUTOLIV DEVELOPMENT AB, Vargarda (SE)

(*) Notice: Subject to any disclaimer, the term of this patent is extended or adjusted under 35 U.S.C. 154(b) by 1261 days.

(21) Appl. No.: 12/933,120

(22) PCT Filed: Mar. 5, 2009

(86) PCT No.: PCT/EP2009/001556
§ 371 (c)(1),
(2), (4) Date: Sep. 17, 2010

(87) PCT Pub. No.: WO2009/118088
PCT Pub. Date: Oct. 1, 2009

(65) Prior Publication Data
US 2011/0011970 A1    Jan. 20, 2011

(30) Foreign Application Priority Data
Mar. 25, 2008  (DE) .......................... 10 2008 015 636

(51) Int. Cl.
*B65H 75/48*     (2006.01)
*B60R 22/46*     (2006.01)

(52) U.S. Cl.
CPC ....... *B60R 22/4676* (2013.01); *B60R 2022/468* (2013.01)

(58) Field of Classification Search
CPC .................. B60R 22/4633; B60R 22/4676
USPC ............... 242/394, 379.1, 374; 280/805, 806, 280/807; 297/470–472, 475–478, 480
See application file for complete search history.

(56) References Cited

U.S. PATENT DOCUMENTS

| | | | | |
|---|---|---|---|---|
| 4,423,846 A * | 1/1984 | Fo/ hl | .......................... | 242/374 |
| 5,895,002 A * | 4/1999 | Sasaki et al. | .................. | 242/374 |
| 5,938,135 A * | 8/1999 | Sasaki et al. | .................. | 242/374 |
| 6,047,914 A * | 4/2000 | Sasaki | ........................ | 242/379.1 |
| 6,598,821 B2 * | 7/2003 | Specht | ........................ | 242/374 |
| 7,427,044 B2 * | 9/2008 | Takamatsu | .................... | 242/374 |
| 7,624,940 B2 * | 12/2009 | Kitazawa et al. | ............. | 242/374 |
| 8,534,588 B2 * | 9/2013 | Maekubo et al. | ............. | 242/379 |
| 2004/0227030 A1 * | 11/2004 | Nagata et al. | ................. | 242/374 |

(Continued)

FOREIGN PATENT DOCUMENTS

DE    695 11 890 T2    4/2000
DE    100 10 379 A1    9/2000

(Continued)

OTHER PUBLICATIONS

Search Report—Jan. 27, 2009.
PCT/EP2009/001556—International Search Report May 22, 2009.

*Primary Examiner* — Sang Kim
*Assistant Examiner* — Juan Campos, Jr.
(74) *Attorney, Agent, or Firm* — Brinks Gilson & Lione

(57) ABSTRACT

The invention relates to a belt tensioner with a belt shaft (10), a force limitation arrangement (70) connected with the belt shaft (10), and a tensioner drive wheel (20) coupled with the belt shaft (10) so as to be locked against relative rotation, in which a retaining element (30, 50) is provided for coupling the tensioner drive wheel (20) to the belt shaft (10), and the retaining element (30, 50) is releasable by the rotation of the belt shaft (10) in the belt webbing withdrawal direction after the tensioning movement has been completed.

8 Claims, 11 Drawing Sheets

(56) References Cited

U.S. PATENT DOCUMENTS

| | | | |
|---|---|---|---|
| 2005/0211816 A1* | 9/2005 | Takamatsu et al. | 242/374 |
| 2005/0224620 A1* | 10/2005 | Takamatsu | 242/374 |
| 2006/0208475 A1* | 9/2006 | Kitazawa et al. | 280/806 |
| 2007/0145174 A1* | 6/2007 | Takamatsu et al. | 242/374 |

FOREIGN PATENT DOCUMENTS

| | | |
|---|---|---|
| DE | 100 39 364 C2 | 8/2002 |
| DE | 103 46 967 A1 | 5/2005 |
| DE | 198 06 483 A1 | 1/2007 |

\* cited by examiner

SEAT BELT PRETENSIONER

CROSS REFERENCE TO RELATED APPLICATIONS

This application claims priority to German patent application number 10 2008 015 636.1, filed Mar. 25, 2008 and PCT international patent application PCT/EP2009/001556 filed Mar. 5, 2009.

FIELD OF THE INVENTION

The invention relates to a seat belt pretensioner with a belt shaft, a force limitation arrangement connected with the belt shaft, and a tensioner drive wheel coupled with the belt shaft so as to be locked against relative rotation.

BACKGROUND OF THE INVENTION

Seat belt pretensioners of type initially mentioned are used in motor vehicles and serve the purpose of reducing or eliminating any belt slack which may be present at the onset of an accident by winding the safety belt, and of coupling the occupant as early as possible to the vehicle deceleration. Owing to the early coupling of the occupant, the stress acting on him is reduced by being distributed onto as long a path as possible of forward displacement. So that the available path of forward displacement can also be fully utilized, the belt pretensioner is additionally provided with a force limitation arrangement by which a force-limited withdrawal of belt webbing is made possible. The occupant loading during the force-limited forward displacement is determined by the design of the force limitation arrangement, in which, through a combination of several force limitation elements in a different sequence, different force limitation patterns can also be set.

A disadvantage in such systems, however, is that owing to the successive opposed rotary movements of the belt shaft during the belt pretensioning and the force limitation, the belt webbing withdrawal movement following the retraction movement can be disturbed by the still occurring tensioning force exerted by the belt pretensioner. This disadvantageous force limitation interference can thereby lead to a brief peak at the start of the force limitation process.

It is an object of the invention to provide a belt pretensioner in which the pretensioner drive wheel and the belt shaft are uncoupled as quickly as possible after the pretensioining movement has taken place, to avoid the force limiter interference, in which of course the pretensioning extent or retraction length of webbing is not to be shortened.

The object of the invention is achieved by a belt pretensioner having the features described herein.

According to the invention, it is proposed that a retaining element is provided for coupling the pretensioner drive wheel to the belt shaft, and the retaining element is releasable by the rotation of the belt shaft in the belt webbing withdrawal direction after the pretensioning movement has been completed. Owing to the proposed retaining element, the pretensioner drive wheel and the belt shaft are initially coupled with each other so as to be locked against relative rotation, so that the pretensioning movement is transferred to the belt shaft in a manner which is as free of loss as possible. The releasing of the retaining element then takes place by the onset of the belt webbing withdrawal movement, so that the force limitation in fact can no longer be disturbed by the force exerted on the belt shaft by the pretensioner drive wheel.

So that the uncoupling of pretensioner drive wheel and belt shaft takes place as immediately as possible with the onset of the belt webbing withdrawal movement, it is proposed that the retaining element is able to be moved from the securing position into a position of readiness by the rotary movement of the pretensioner drive wheel. In the position of readiness, the retaining element still couples the pretensioner drive wheel with the belt shaft, but is already in a position from which the releasing of the connection takes place with as little loss of time as possible.

The releasing is preferably then brought about by the onset of the belt webbing withdrawal movement, in which here the advantage can be utilized that the belt webbing withdrawal movement is directed in a direction opposite to the pretensioning movement, so that a releasing of the retaining element in error can still be ruled out during the pretensioning movement.

It is further proposed that the pretensioner drive wheel and the belt shaft are coupled with each other via a ramp contour, and the releasing movement of the retaining element is able to be activated by the carrying out of an axial movement of the pretensioner drive wheel which is forced by the ramp contour. Here, the proposed ramp contour can be utilized both to move the retaining element out of the securing position into the position of readiness, and also for the actual releasing from the position of readiness into the releasing position. The ramp contour can also be designed here so that the deliberately forced axial movement only takes place until the position of readiness is reached, and then a force transmission is possible in the peripheral direction, in order to transfer the actual pretensioning movement.

It is further proposed that a clamping surface is provided on the belt pretensioner housing, on which surface the retaining element is able to be fixed by carrying out the belt webbing withdrawal movement, and the releasing movement of the retaining element from the belt shaft and/or the pretensioner drive wheel is brought about by the fixing.

It is further proposed that the retaining element is formed by a spring plate which is keyed with the belt shaft. The proposed spring plate can be produced as a favourably priced stamped part. In addition, with a corresponding selection of the spring steel, the spring plate fulfils the mechanical material requirements with regard to the force assimilation during the pretensioning process and also during the changeover from the retraction movement into the belt webbing withdrawal movement. In addition, the choice of the spring steel makes it possible that the retaining element is prestressed elastically in the position of readiness by the pretensioner drive wheel, so that the retaining element automatically moves into the releasing position after the rotary movement has been carried out at the start of the force limitation.

The spring plate can have a bore with an inner toothing, and can be slidable onto a shoulder of the belt shaft which is provided with an outer toothing, in which the pushed-on spring plate is able to be fixed by rotating and keying on the belt shaft. The spring plate is thereby deliberately keyed by a directed rotary movement which, in the opposite direction, is used by the onset of the belt webbing withdrawal movement of the belt shaft for releasing the spring plate.

So that the onset of the belt webbing withdrawal movement is converted directly into a releasing movement of the spring plate, a stop is provided on the pretensioner drive wheel, against which stop the spring plate lies. During the mounting of the spring plate, the stop serves as a limit to the rotary movement which is necessary for the keying. As the pretensioner drive wheel, during the conversion from the belt retraction movement into the belt withdrawal movement of the belt shaft is acted upon with the pretensioning force still present in the retraction direction, the stop can be used in addition as a quasi fixed stop surface for the spring plate which is connected with the belt shaft. The spring plate is thereby additionally fixed with respect to the pretensioner drive wheel.

It is further proposed that the pretensioner drive wheel has at its end face facing away from the belt shaft a taper against which the spring plate lies and the spring plate carries out a swivelling movement by carrying out an axial movement of the pretensioner drive wheel and thereby fixes itself against the belt pretensioner housing. The proposed taper makes possible a linear or punctiform abutment of the spring plate and, with an axial movement of the pretensioner drive wheel, produces the required swivelling movement of the spring plate for the application of the clamping force.

The swivelling movement is further simplified by the spring plate having spring arms spaced apart on its outer periphery, and by lying with the spring arms against the taper. Owing to the spaced spring arms, firstly the spring rigidity is deliberately reduced, so that the swivelling movement is carried out reliably and, in addition, the spring arms can carry out a fan movement, directed towards each other, during the swivelling movement.

A further preferred embodiment of the invention consists in that the spring arms project in the axial direction from the spring plate and, whilst the axial movement of the pretensioner drive wheel is being carried out, carry out an inwardly directed swivelling movement, whereby the spring arms draw together and the necessary clamping force can be produced in a structurally simple manner.

A further preferred embodiment of the invention consists in that the spring arms in cross-section form at least partially an obliquely directed ratchet contour, and the clamping surface of the belt pretensioner housing has a counter contour which permits a relative rotation of the spring plate to the clamping surface in one direction and with a relative rotation of the spring plate to the clamping surface in the other direction secures the spring plate. The spring element can thereby already be brought during the pretensioning into the position in which it is fixed with the reversal of the direction of rotation of the belt shaft without a further adjustment movement with respect to the belt tensioner housing.

In addition, it is proposed that the spring arms of the spring plate have a mechanical coding defining the installation position, so that an incorrect installation is prevented and an automated production process is made possible.

The coupling of the pretensioner drive wheel to the belt shaft can be further improved by a blocking element being provided between the belt shaft and the pretensioner drive wheel, and by the blocking element being secured in the blocked position by the retaining element.

The retaining element can be formed for example by a band, in which a first end of the band secures the blocking element in the blocked position, and the second end is able to be fixed with respect to the belt pretensioner housing by carrying out the belt withdrawal movement.

A simple type of fixing of the band consists in that the second end is able to be fixed by winding around a clamping surface arranged on the belt pretensioner housing. The rotary movement carried out by the belt shaft is thereby also used as a winding-around movement of the band about the fixed clamping surface which is necessary for fixing the band.

BRIEF DESCRIPTION OF THE DRAWINGS

The invention is described in further detail below with the aid of a preferred embodiment. In the figures, the following can be seen in detail:

FIG. 1a-1e show a belt pretensioner in accordance with this invention with a spring plate before the activation of the pretensioner drive, in which FIG. 1c is a front view, FIG. 1a is a cross-section along line D-D, FIG. 1b is a cross-section along line B-B, and FIG. 1d is a cross-section along line A-A and FIG. 1 is a cross-section along line C-C;

FIG. 2a-2e show a belt pretensioner with a spring plate with an activated pretensioner drive, in which FIG. 2c is a front view, FIG. 2a is a cross-section along line D-D, FIG. 2b is a cross-section along line B-B; FIG. 2d is a cross-section along line A-A and FIG. 2e is a cross-section along line C-C;

FIG. 3a-3e show a belt pretensioner with a spring plate at the onset of the force limitation with a coupled-on pretensioner drive wheel; in which FIG. 3a is a cross-section along line D-D, FIG. 3b is a cross-section along line B-B; FIG. 3d is a cross-section along line A-A and FIG. 3e is a cross-section along line C-C and FIG. 3e is a cross-section along line C-C;

FIG. 4a-4e show a belt tensioner with a spring plate during the force limitation with an uncoupled pretensioner drive wheel; in which FIG. 4c is a front view, FIG. 4a is a cross-section along line D-D, FIG. 4b is a cross-section along line B-B; FIG. 2d is a cross-section along line A-A and FIG. 4e is a cross-section along line C-C;

DETAILED DESCRIPTION OF THE INVENTION

Figure 1A:
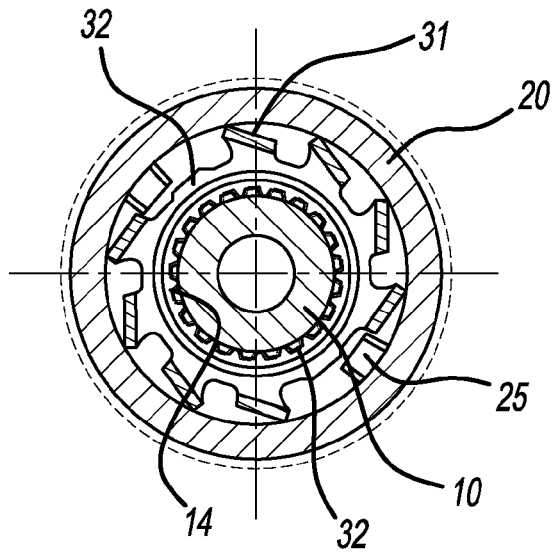
Figure 1B:
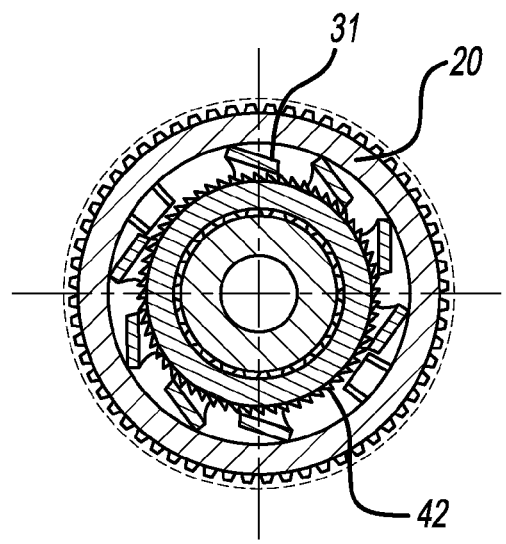
Figure 1C:
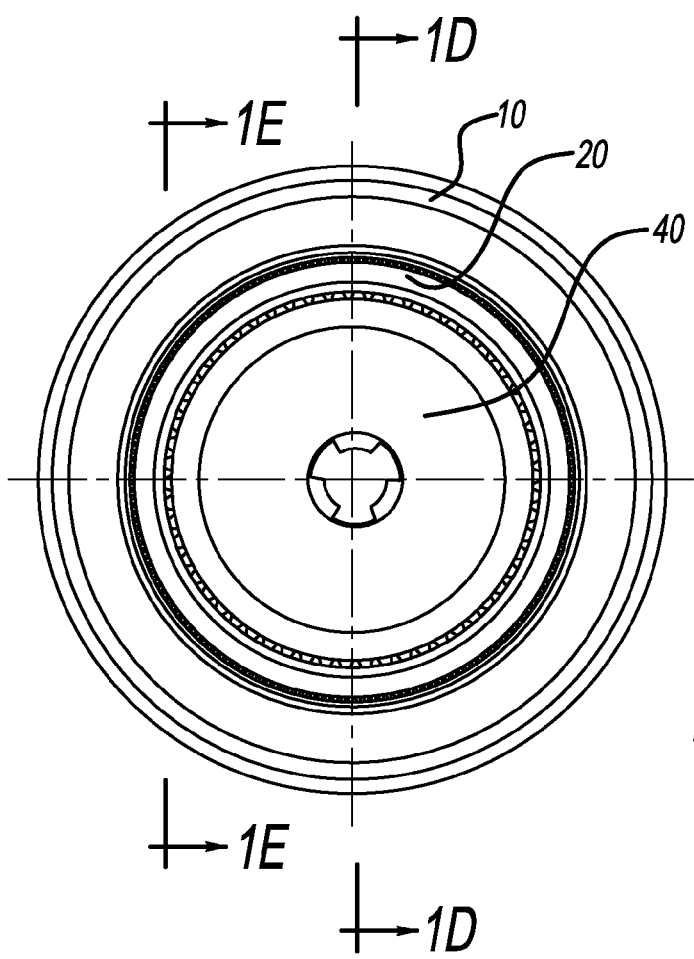
Figures 1D, 1E:
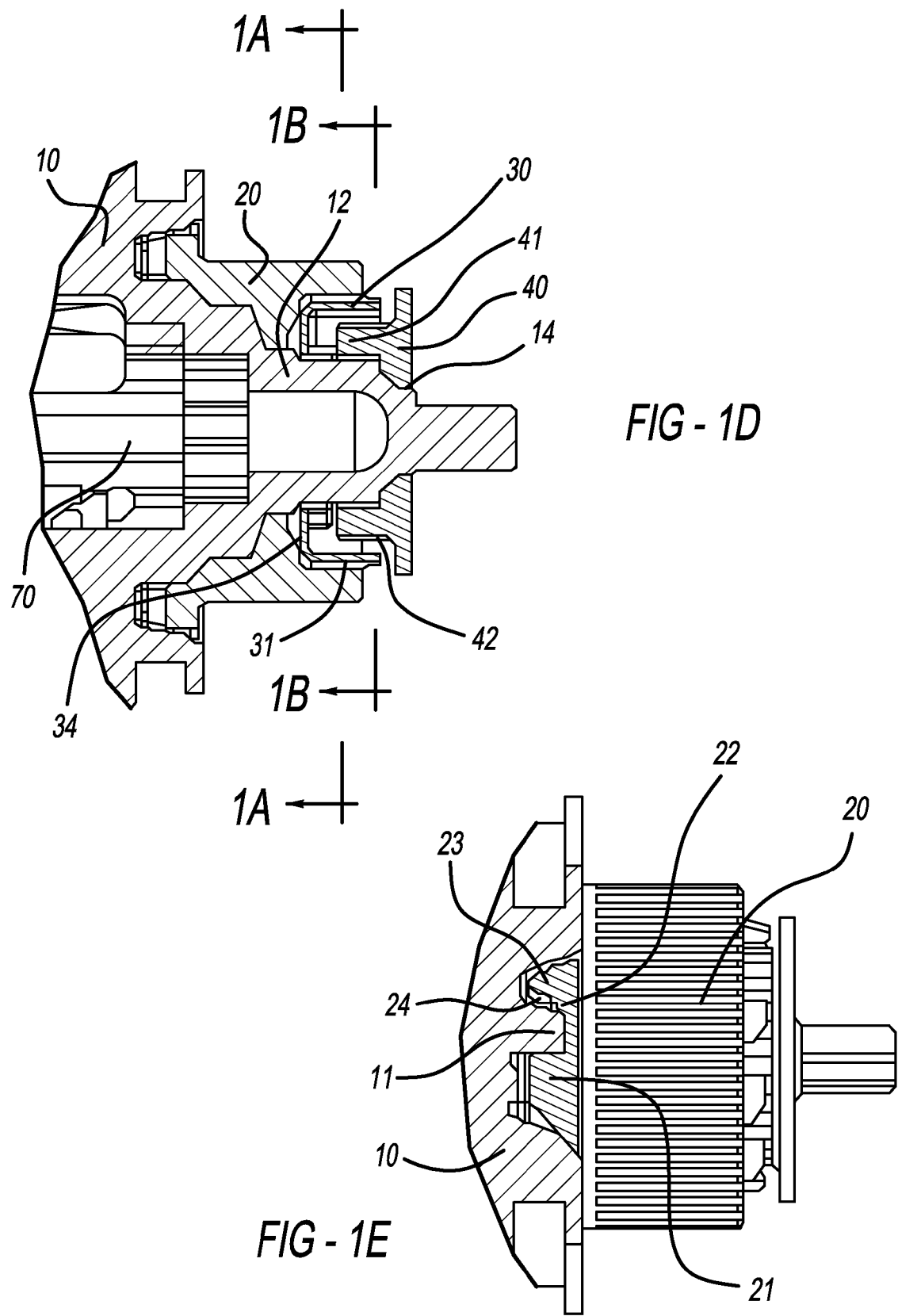
Figure 2A:
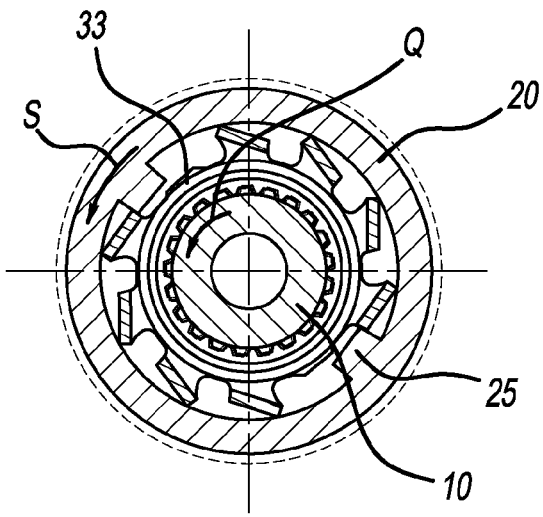
Figure 2B:
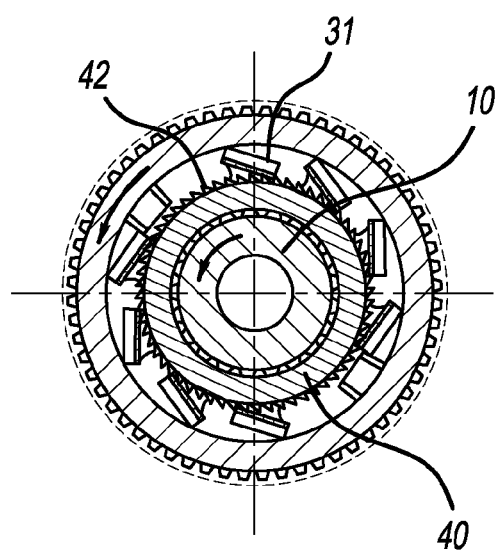
Figure 2C:
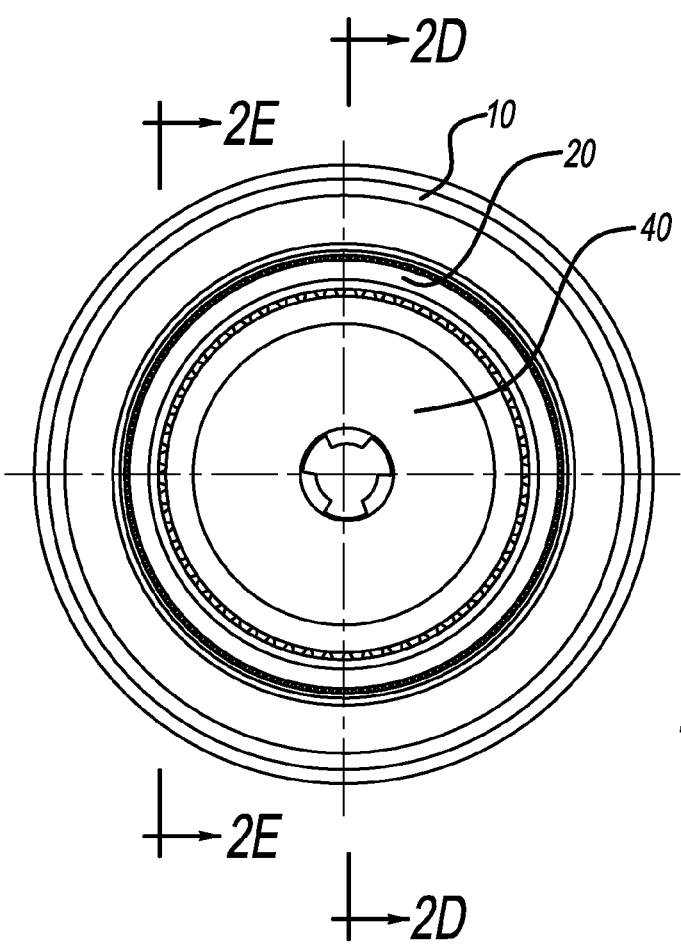
Figure 2D:
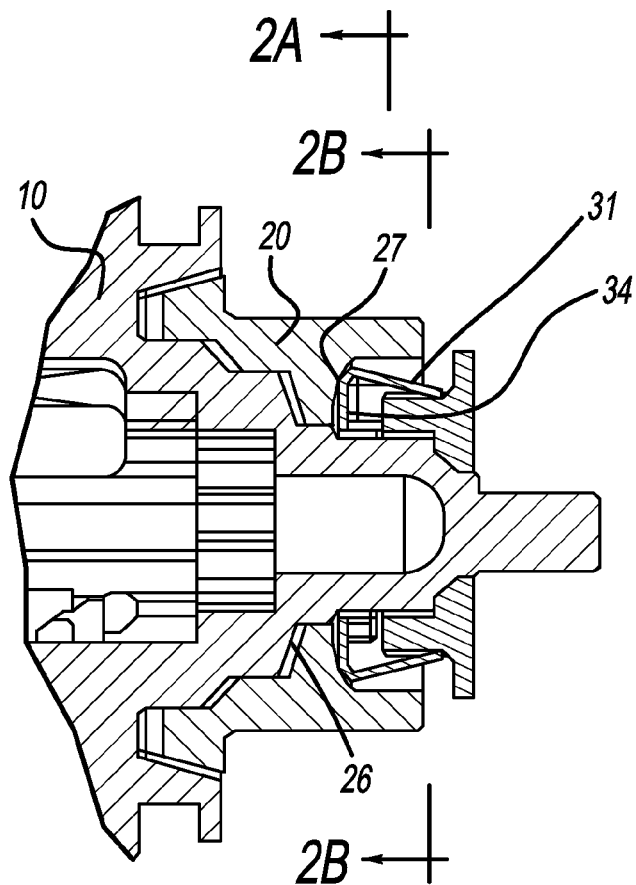
Figure 2E:
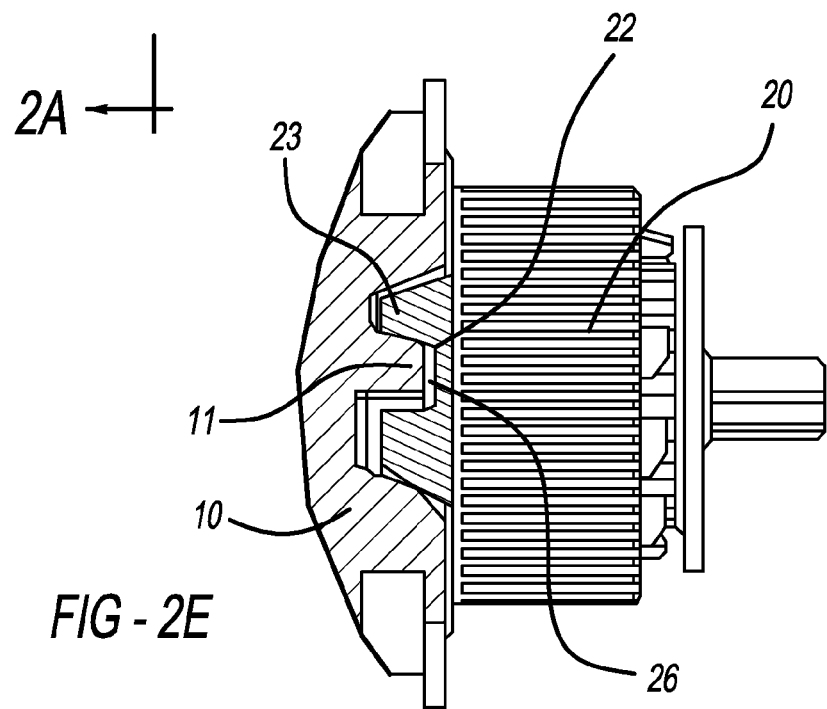
Figure 3A:
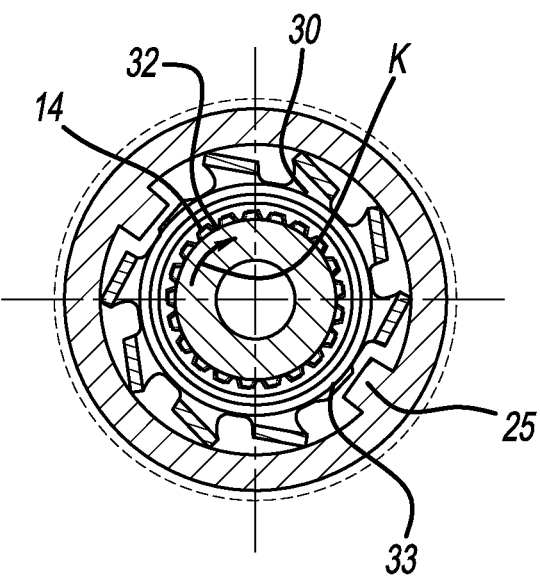
Figure 3B:
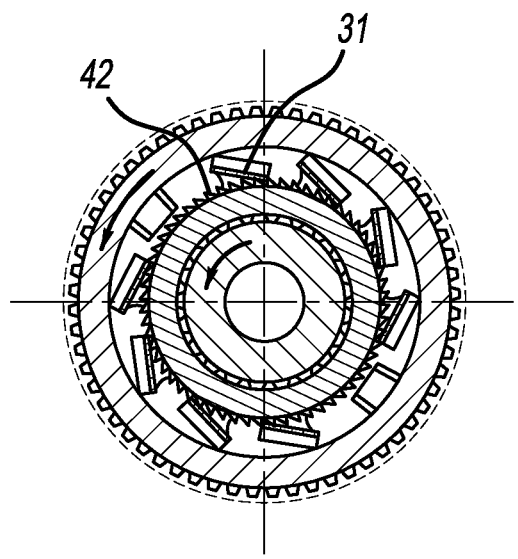
Figure 3C:
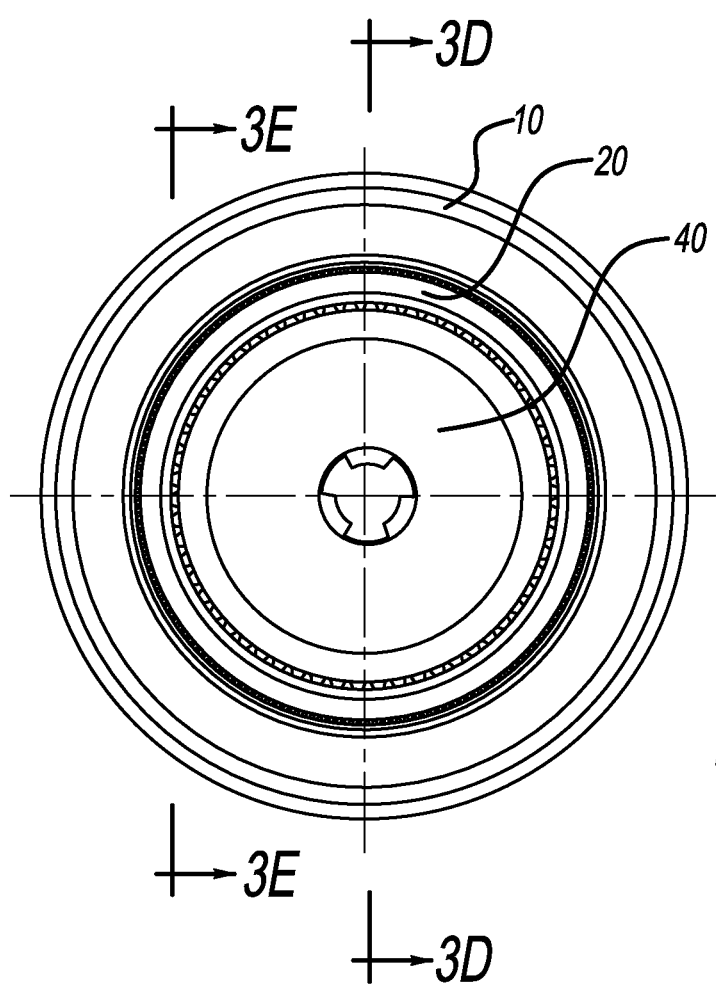
Figure 3D:
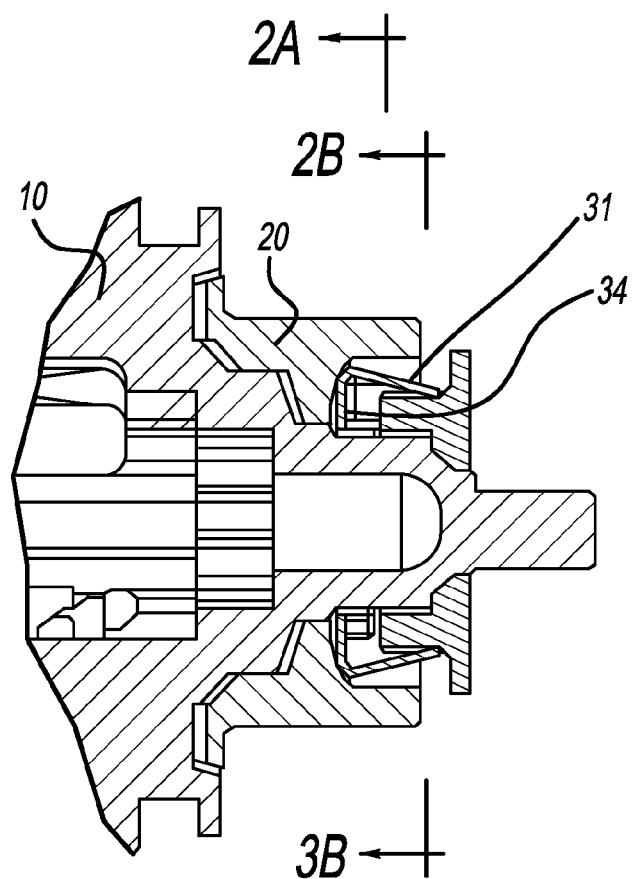
Figure 3E:
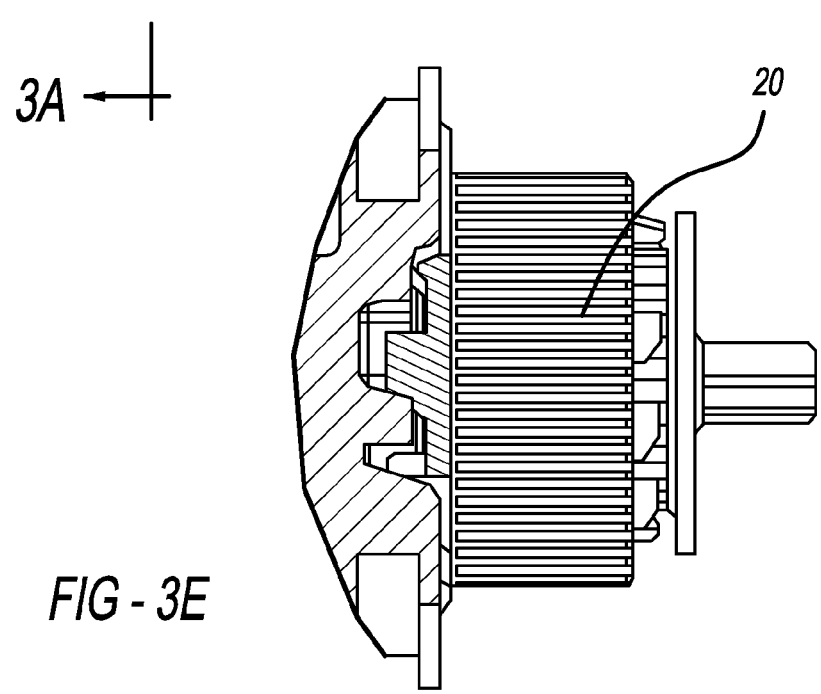

In FIG. 1a-1e a belt pretensioner, constructed according to the invention can be seen with a belt shaft 10, a pretensioner drive wheel 20, driving the belt shaft 10 in the winding direction during the tensioning process, in the state before the start of the pretensioning process. In addition, an end, fixed to the belt shaft, of a torsion rod 70, acting as a force limitation arrangement, can be seen, which in connection with the pretensioning process makes possible a force-limited withdrawal of belt webbing. For the sake of clarity, in the following only the part of the belt pretensioner is illustrated and described which relates to the coupling of the pretensioner drive wheel 20 and the belt shaft 10. In FIG. 1c, the belt pretensioner can be seen from the end side, in which in particular a cut-out of the fixed belt pretensioner housing 40, in this case a part of the spring case, and the belt shaft 10 and the pretensioner drive wheel 20, arranged concentrically to each other, can be seen. The view of the section directions C-C and A-A are illustrated in FIGS. 1e and 1d, respectively. The pretensioner drive wheel 20 is arranged laterally on the belt shaft 10 and is connected therewith via a ramp contour 21. The belt shaft 10 has a tooth 11 which projects into the base of the ramp contour 21 and lies on the peripheral side against a bevel 22. In addition, the belt shaft 10 is provided with a shoulder 12 on which a spring element 30 is provided, acting as a retaining element. A toothing (series of teeth) 14 is arranged on the shoulder 12, onto which toothing the spring element 30 with a bore and an inner toothing 32 arranged therein is able to be pushed. The spring element 30 itself is formed from a radially extending spring plate 34 and spring arms 31 projecting axially from the outer rim of the spring plate 34. The spring arms 31 embrace a flange 41 of the fixed belt pretensioner housing 40, in this case the spring case. The spring arms 31 have in addition a gap 33 representing a mechanical coding. Owing to the mechanical coding (or indexing), the spring element 30 can only be pushed with the inner toothing (teeth) 32 onto the toothing 14 of the belt shaft 10 in the position in which the gap 33 overlaps with a stop 25 which projects inwards from the pretensioner drive wheel 20. The spring element 30 is then turned clockwise with the aid of a corresponding tool into the position illustrated in FIG. 1*a*, until the stop 25 comes to lie against one of the spring arms 31. In order that the spring element 30 can be turned with respect to the belt shaft 10, it is important that the material of the spring element 30 is harder than that of the belt shaft. For this, the spring element 30 is preferably formed from spring steel, whereas the belt shaft is produced for example from a cast aluminium. In the retaining position which is thus produced, the spring element 30, with the kink formed by the transition from spring plate 34 and spring arms 31, lies against a taper 27 of the pretensioner drive wheel 20 and thereby presses it against the belt shaft 10 into the position shown in FIG. 1*e*.

At the start of the pretensioning movement, the pretensioner drive wheel 20 is set in rotation in the arrow direction "S" and, in so doing, drives the belt shaft 10 in the retracting direction "Q". The position of the individual parts with respect to each other in this phase is illustrated FIG. 2*a*-2*e*. Owing to the rotation of the pretensioner drive wheel 20 and the torque transmission connected therewith onto the belt shaft 10, the pretensioner drive wheel 20 has pressed itself with the bevel 22 against the tooth 11 of the belt shaft 10 and, in so doing, has completed a slight movement in the axial direction, so that a gap 26 has resulted between the belt shaft 10 and the pretensioner drive wheel 20. In addition, the pretensioner drive wheel 20 has stressed the spring element 30 via the taper 27 in the axial direction, so that the spring arms 31 carry out an inwardly directed swivelling movement into the illustrated position of readiness. At this moment, the spring element 30 is still held securely on the shoulder 12 owing to the keying of the toothings 14 and 32, so that the pretensioner drive wheel 20 cannot move the spring element 30. The spring arms 31 are constructed so as to be oblique in cross-section and ratchet owing to the rotation direction "Q" of the belt shaft 10 in the retraction direction over a fixed flange 41 with a toothing 42 arranged thereon of the belt tensioner housing 40. The transmission of the peripheral force during the pretensioning process from the pretensioner drive wheel 20 to the belt shaft 10 takes place from the tooth 23 to the tooth 11, which in this position lie with surfaces against each other, which are constructed so as to be straight or only slightly oblique, so that the peripheral force is transmitted as free of losses as possible, and no unnecessarily high axial forces occur, which could lead to a releasing of the spring element 30. It goes without saying that several pairs of teeth can also be provided for the transmission.

Figure 4A:
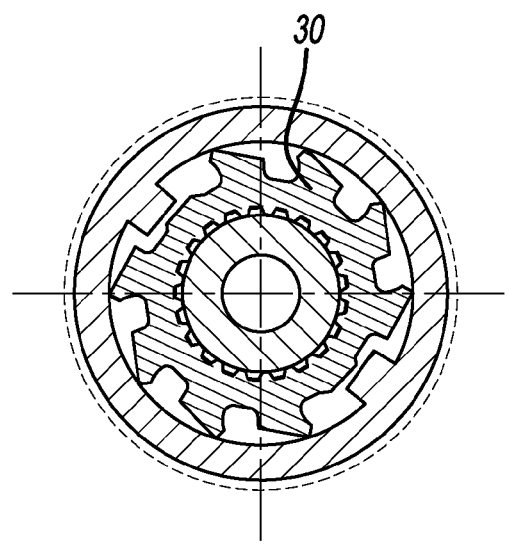
Figure 4B:
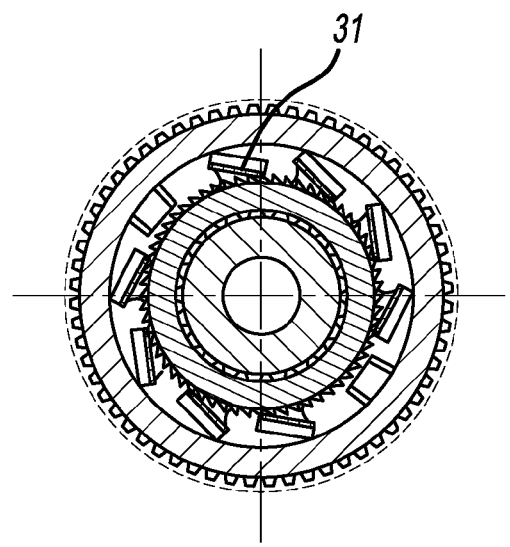
Figure 4C:
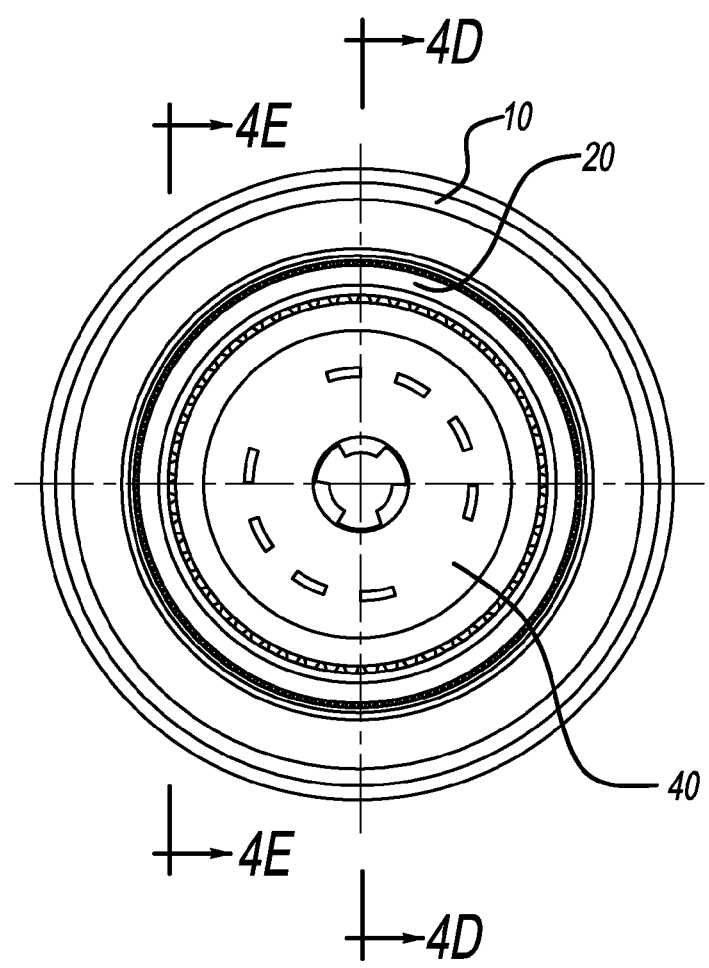
Figure 4D:
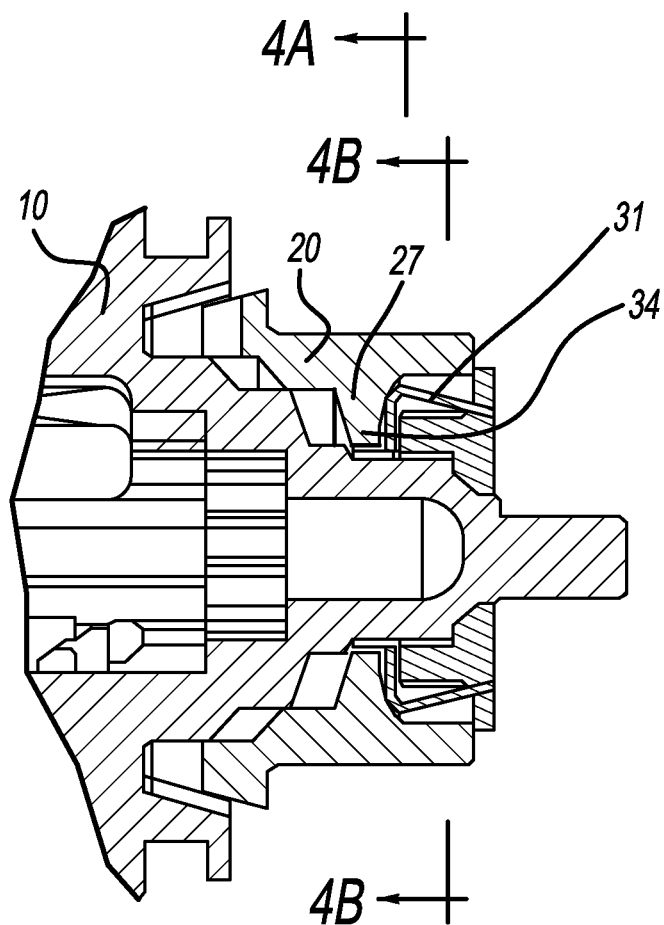
Figure 4E:
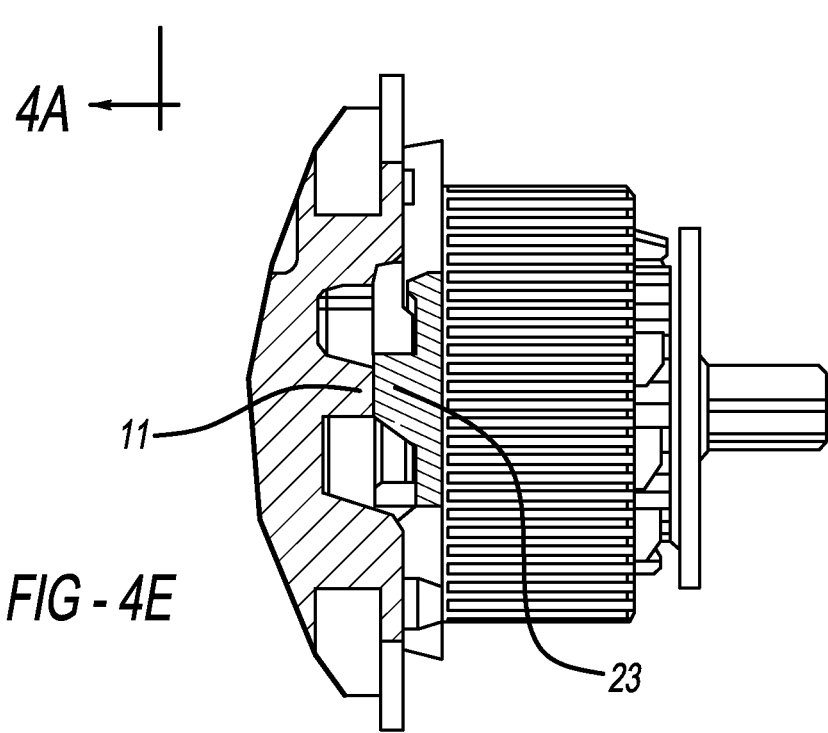

At the start of the force limitation, the pretensioner drive wheel 20 is at a standstill and the rotation direction of the belt shaft 10 reverses into the belt withdrawal direction "K", as illustrated in FIG. 3*a*-3*e*. In so doing, the spring element 30 is fixed with respect to the belt pretensioner housing 40 via the obliquely directed spring arms 31 securing themselves in the toothing 42 on the flange 41. The belt shaft 10 carries out a slight relative rotation here with respect to the spring element 30, directed contrary to the keying movement during the mounting process, until the toothings 14 and 32 are unkeyed again. The activation of the relative rotation of spring element 30 and belt shaft 10 can be further assisted by the spring element 30 lying with one of the spring arms 31 against the stop 25, which is fixed by the tensioning force which is still present. As soon as the spring element 30 has reached the position shown in FIG. 3*a*, in which the gap 33 comes to lie under the stop 25, the spring element 30 is moved out from the position of readiness axially into the position shown in FIG. 4*d* owing to the spring prestressing described above. In this position, the spring element 30 is no longer connected with the belt shaft 10 and has penetrated the belt pretensioner housing 40 with the spring arms 32. The pretensioner drive wheel 20 likewise completes an axially directed movement here up to reaching the position in FIG. 4*e*, in which the pretensioner drive wheel 20 is no longer in engagement with the belt shaft 10 and is therefore uncoupled.

Figure 5A:
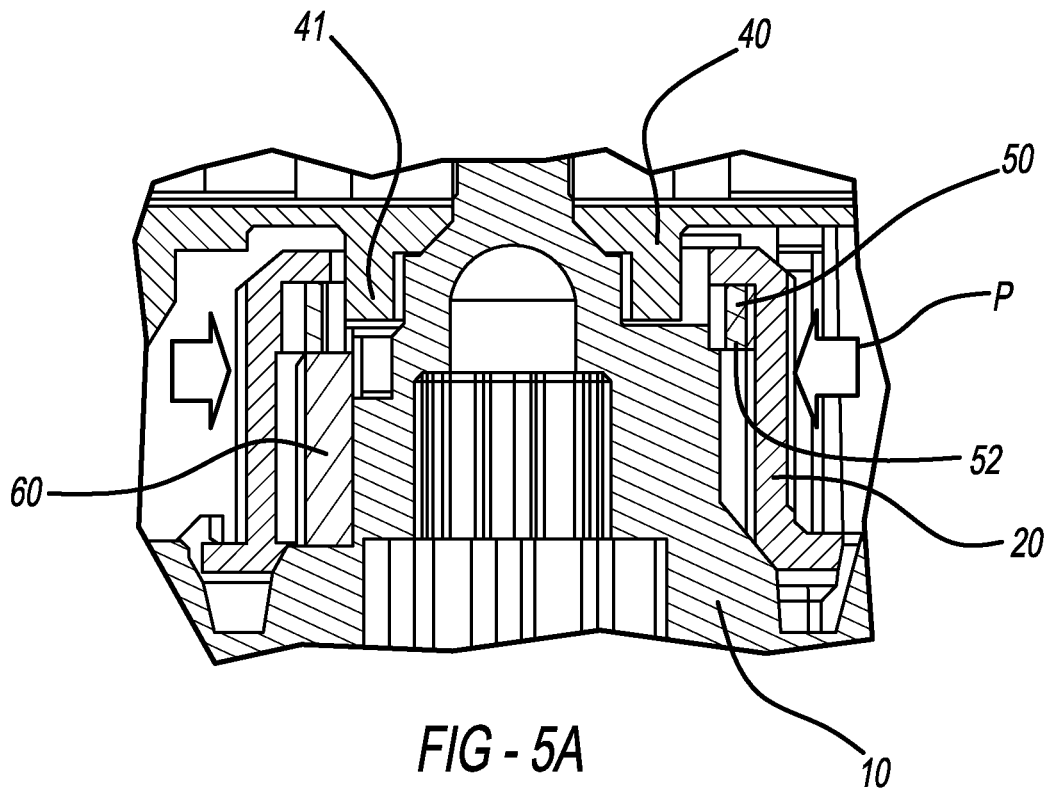
FIG. 5a-5b show a belt pretensioner with a blocking element between the pretensioner drive wheel and the belt shaft and a band for securing the blocking element.
Figure 5B:
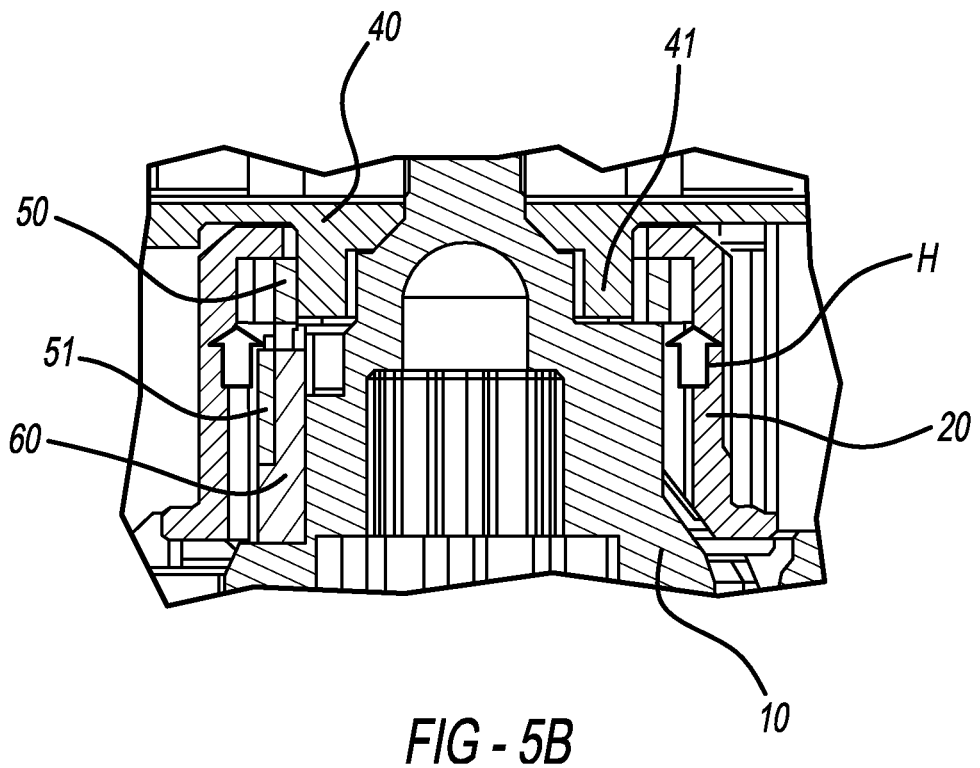
Figure 6A:
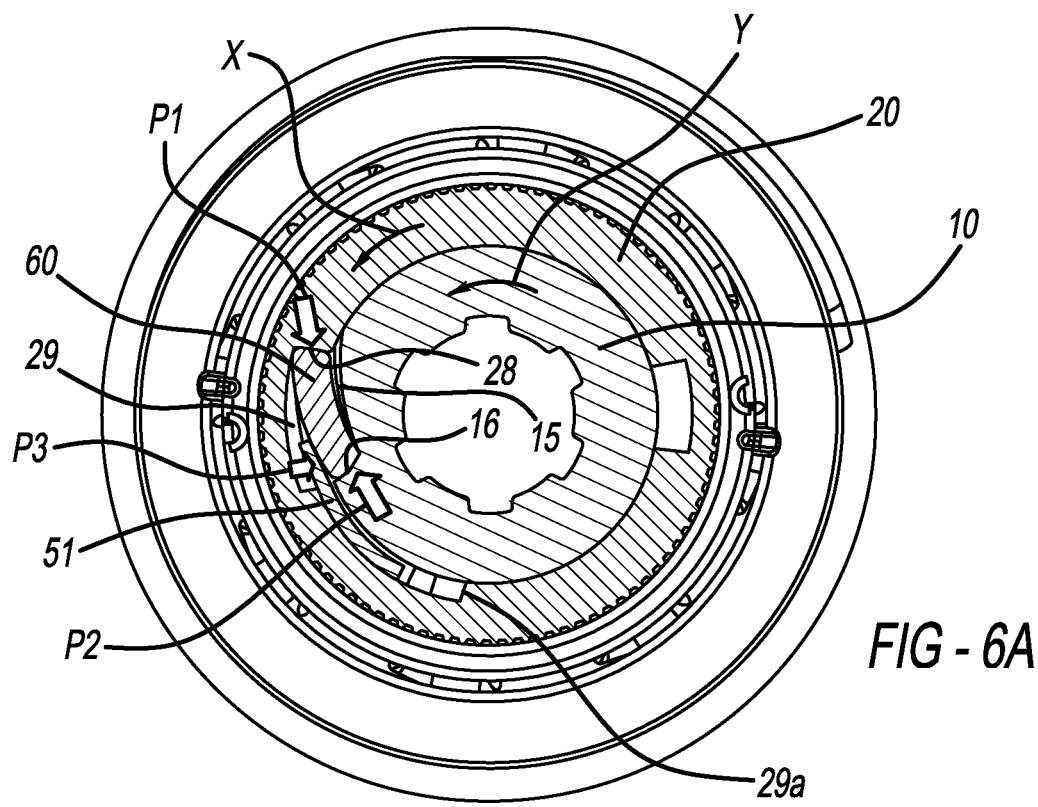
FIG. 6a-6d show a belt pretensioner with a blocking element between the pretensioner drive wheel and the belt shaft and a band for securing the blocking element with illustration of the releasing movement.
Figure 6B:
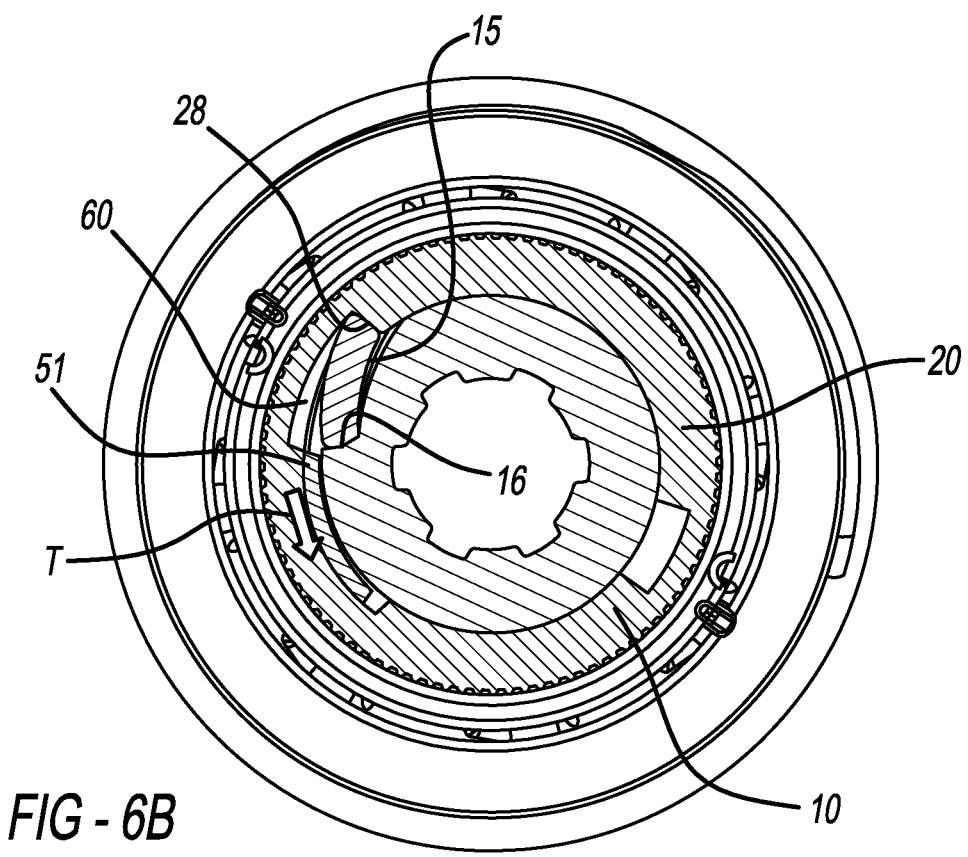
Figure 6C:
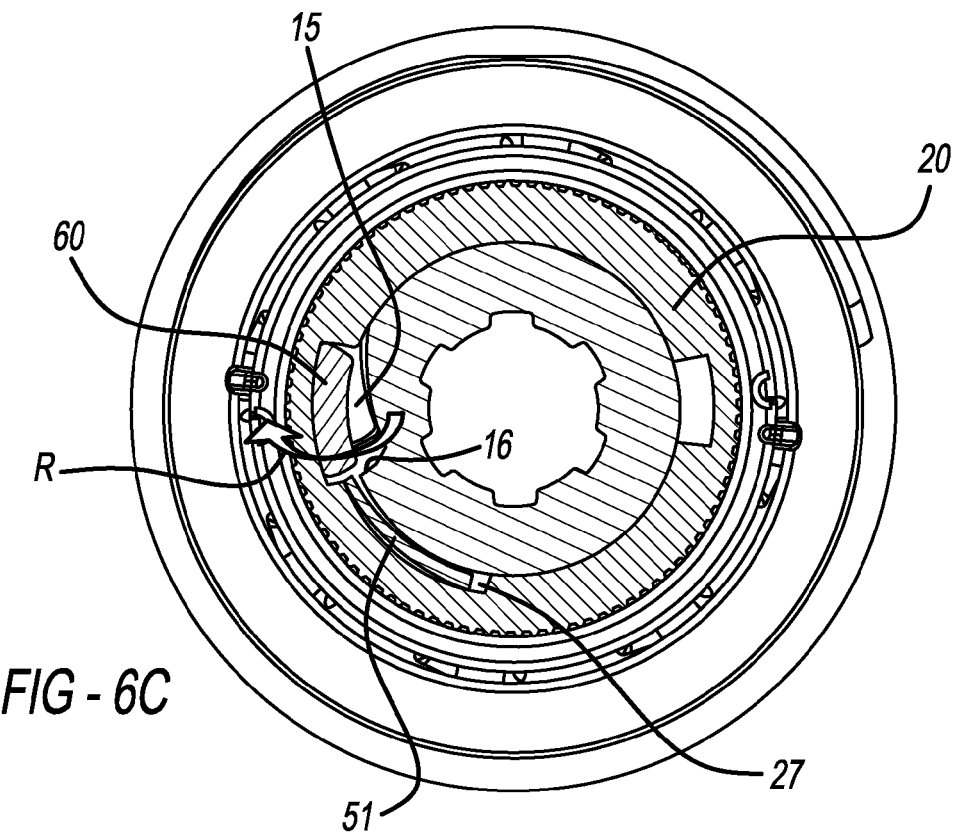
Figure 6D:
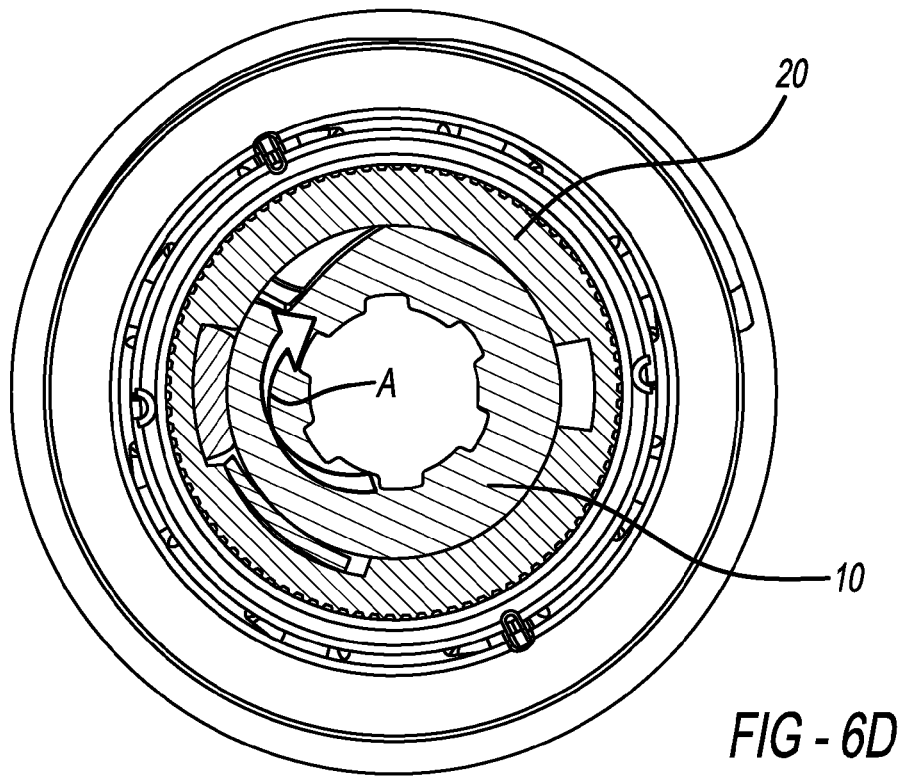

In FIG. 5*a* and FIG. 5*b* a further example embodiment is shown, in which the pretensioner drive wheel 20 is coupled via a blocking element 60 with the belt shaft 10. The blocking element 60 is secured in the blocked position by means of a retaining element constructed as a band element 50. The blocked position is illustrated in FIG. 5*a*. In the secured position, the band element 50 winds around the belt shaft 10 with a winding section 52 and secures the blocking element 60 with an end 51. To release the band element 50, the pretensioner drive wheel 20 carries out an axial movement in arrow direction "H" at the start of the pretensioning process, in which the winding section 52 is moved into a position of readiness in which it winds around a fixed flange 41 of the belt pretensioner housing. With the onset of the force limitation, the belt shaft turns in the belt webbing withdrawal direction, in which the end 51 is drawn along and fixes the winding section 52 by the looping on the flange 41. Through the fixing of the winding section on the flange 41, finally the end 51 is secured, and the blocking element 60 is automatically released.

In FIG. 6*a*-6*d* the cooperation of the individual parts during the uncoupling process can be seen in cross-section. Starting from FIG. 6*a*, the belt pretensioner is initially in the position in which the pretensioner drive wheel 20 drives the belt shaft 10 in the arrow direction "Y" and in so doing, itself turns in the arrow direction "X". Between the pretensioner drive wheel 20 and the belt shaft 10, a blocking element 60 is provided which engages into a recess 29 on the pretensioner drive wheel 20 and a recess 15 on the belt shaft 10. The drive moment of the pretensioner drive wheel 20 is transmitted here via the pressure surface 28 and the pressure surface 16 to the belt shaft 10, in which the pressure forces P1 and P2 are exerted respectively onto the pressure surfaces 28 and 16. In addition, an end 51 of the band element 50, acting as retaining element, can be seen, which secures the blocking element 60 in the illustrated coupling position with the exertion of the clamping force P3. Due to the fixing of the winding section 52 on the flange 41, the end 51 is secured and slips in arrow direction "T" in a free space 29*a* of the pretensioner drive wheel 20. In the position, which is now not secured, the blocking element 60 swivels in the arrow direction "R" into the recess 29 and, in so doing, leaves the recess 15 on the belt shaft 10. The swivelling movement can be assisted here by the onset of the rotation of the belt shaft 10 during the force limitation in the arrow direction "A", by the pressure surface 16 being constructed as a bevel.

While the above description constitutes the preferred embodiment of the present invention, it will be appreciated that the invention is susceptible to modification, variation, and change without departing from the proper scope and fair meaning of the accompanying claims.

The invention claimed is:

1. A belt pretensioner comprising a belt shaft, a force limitation arrangement connected with the belt shaft, and a pretensioner drive wheel coupled with the belt shaft so as to be locked against relative rotation, a retaining element is provided for coupling the pretensioner drive wheel to the belt shaft enabling the pretensioner drive wheel to drive the belt shaft in a pretensioning direction by a pretensioning direction movement, and the retaining element is releasable to uncouple the pretensioner drive wheel from the belt shaft by the rotation of the belt shaft in a belt webbing withdrawal direction after the pretensioning direction movement has taken place, the retaining element being formed by a spring plate with an inner toothing configured to be keyed with an outer toothing of the belt shaft while the pretensioner drive wheel moves in the pretensioning direction and to be unkeyed from the outer toothing of the belt shaft by the rotation of the belt shaft relative to the spring plate in the webbing withdrawal direction, wherein the pretensioner drive wheel and the belt shaft interact with each other via a ramp contour formed on the pretensioner drive wheel, and the retaining element is axially moved by an axial movement of the pretensioner drive wheel relative to the belt shaft forced by the ramp contour.

2. The belt pretensioner according to claim 1 further comprising that a clamping surface is provided on a belt pretensioner housing and that the spring plate includes spring arms configured to engage the clamping surface by a webbing withdrawal direction movement, and the spring plate is configured to be released from the outer toothing of the belt shaft while the spring arms engage the clamping surface.

3. The belt pretensioner according to claim 1, further comprising that a stop, delimiting a rotation angle of the spring plate relative to the pretensioner drive wheel, is provided on the pretensioner drive wheel.

4. A belt pretensioner comprising a belt shaft, a force limitation arrangement connected with the belt shaft, and a pretensioner drive wheel coupled with the belt shaft so as to be locked against relative rotation, a retaining element is provided for coupling the pretensioner drive wheel to the belt shaft enabling the pretensioner drive wheel to drive the belt shaft in a pretensioning direction by a pretensioning direction movement, and the retaining element is releasable to uncouple the pretensioner drive wheel from the belt shaft by the rotation of the belt shaft in a belt webbing withdrawal direction after the pretensioning direction movement has taken place, the retaining element being formed by a spring plate with an inner toothing configured to be keyed with an outer toothing of the belt shaft while the pretensioner drive wheel moves in the pretensioning direction and to be unkeyed from the outer toothing of the belt shaft by the rotation of the belt shaft relative to the spring plate in the webbing withdrawal direction, wherein the pretensioner drive wheel has on an end side facing away from the belt shaft a taper against which the spring plate lies, and the spring plate carries out a swiveling movement caused by an axial movement of the pretensioner drive wheel, and thereby engaging a belt pretensioner housing.

5. The belt pretensioner according to claim 4, further comprising that the spring plate has an outer periphery with spring arms spaced apart on the outer periphery and lies with the spring arms against the taper, the spring plate and the spring arms forming a spring element.

6. The belt pretensioner according to claim 5, further comprising that the spring arms project from the spring plate in the axial direction and in reaction to the axial movement of the pretensioner drive wheel, carry out an inwardly directed swiveling movement.

7. The belt pretensioner according to claim 5 further comprising that the spring arms form in cross-section at least partially an obliquely directed ratchet contour, a clamping surface is provided on the belt pretensioner housing, and the clamping surface of the belt pretensioner housing has a counter contour which permits a relative rotation of the spring plate to the clamping surface in a first direction and fixes the spring plate with a relative rotation of the spring plate to the clamping surface in a second direction opposite the first direction.

8. The belt pretensioner according to claim 5 further comprising that the spring arms of the spring element have a gap overlapping with a stop on the pretensioner drive wheel and defining an installation position of the spring element on the belt shaft.

* * * * *